United States Patent
Kobayashi

(10) Patent No.: US 7,072,078 B2
(45) Date of Patent: Jul. 4, 2006

(54) IMAGE STORAGE APPARATUS, IMAGE STORAGE METHOD, AND STORAGE MEDIUM

(75) Inventor: Makoto Kobayashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1065 days.

(21) Appl. No.: 09/946,340

(22) Filed: Sep. 6, 2001

(65) Prior Publication Data

US 2002/0051212 A1 May 2, 2002

(30) Foreign Application Priority Data

Sep. 8, 2000 (JP) ............................. 2000-273558

(51) Int. Cl.
*H04N 1/32* (2006.01)
*H04N 1/00* (2006.01)

(52) U.S. Cl. ...................... 358/426.12; 358/426.05; 358/403; 382/244; 382/305

(58) Field of Classification Search ........... 358/426.12, 358/426.05, 403, 426.01, 404, 444, 524, 358/523, 1.17, 1.16; 382/244, 245, 246, 382/305, 306

See application file for complete search history.

(56) References Cited

U.S. PATENT DOCUMENTS 5,720,014 A * 2/1998 Ikeda et al. ................. 358/1.15
2005/0134932 A1* 6/2005 Hashimoto et al. ..... 358/426.06

FOREIGN PATENT DOCUMENTS

| JP | 10079846 A | * | 3/1998 |
| JP | 10-336370 | | 12/1998 |
| JP | 2000-92301 | | 3/2000 |
| JP | 2004015691 A | * | 1/2004 |

* cited by examiner

*Primary Examiner*—Cheukfan Lee
(74) *Attorney, Agent, or Firm*—Fitzpatrick, Cella, Harper & Scinto

(57) ABSTRACT

Information including parameters for JBIG-encoding is managed page-by-page, and image information is JBIG-encoded with the information managed page-by-page, after which the encoded data is stored in an image memory. The encoded data stored is then decoded with the information managed page-by-page. The number of encoding lines on pages to be JBIG-encoded and the number of scanning lines on images scanned page-by-page by a scanner are centrally managed as a common parameter.

12 Claims, 5 Drawing Sheets

IMAGE STORAGE APPARATUS, IMAGE STORAGE METHOD, AND STORAGE MEDIUM

FIELD OF THE INVENTION

This invention relates to an image storage apparatus, an image storage method, and a storage medium for encoding, storing, and managing image information.

BACKGROUND OF THE INVENTION

Conventionally, various schemes are known and adopted as coding schemes for encoding binary images in image storage apparatus for encoding, storing, and managing digital images. For example, facsimile machines adopt Modified Huffman (MH), Modified Read (MR), and Modified Modified Read (MMR) coding schemes, by which images to be transmitted or received are encoded, then stored and managed in memory, and used for communication.

In the example of facsimile transmission, originals are scanned page-by-page and converted into digital signals so as to be stored as codes. At this time, information such as the page number, the horizontal scanning width, the number of lines, the resolutions, and the coding scheme is stored as page management information for each page. Further, when the encoded data is transmitted, the receiver machine is informed of necessary information based on this management information.

Recently, however, the JBIG (Joint Bi-level Image Group) coding scheme described in ITU-T recommendations T. 82 and T.85 came to be adopted for further enhancement of communication rates and encoding efficiency. In the JBIG coding scheme, encoded data (BIE) on a given page consists of a header (BIH) portion that stores parameters therein and a data (BID) portion that is image data. The header (BIH) portion includes parameters specifying the image size, the encoding mode, etc., for encoding/decoding, and it consists of 20 bytes of data.

However, this conventional manner of storage and management with the JBIG coding scheme has a problem that information for each page is stored in both the page management information and the header (BIH) portion with the result of inefficient use of memory.

For example, when originals to be transmitted are scanned page-by-page, the number of scanning lines on each scanned image is stored in the page management information. Then, because digital signals of the scanned images are JBIG-encoded, the number of encoding lines on each page is also stored in the header (BIH) portion of the JBIG-encoded data (BIE), and the number of the encoding lines and the number of the scanning lines are the same parameter. Thus, storing the same parameter in the page management information and the header (BIH) portion cannot be considered as efficient use of memory.

SUMMARY OF THE INVENTION

This invention has been made to solve the above-mentioned problem, and an object of the invention is to provide an image storage apparatus, an image storage method, and a storage medium that are capable of centrally managing the header portions of JBIG-encoded data by page management information.

According to the present invention, the foregoing object is attained by providing an image storage apparatus comprising: managing means for managing, page-by-page, information including parameters for JBIG-encoding; encoding means for JBIG-encoding image information with the information managed page-by-page; storing means for storing encoded data; and decoding means for decoding, with the information managed page-by-page, encoded data that is stored.

According to another aspect of the present invention, the foregoing object is attained by providing an image storage method comprising: a managing step for managing, page-by-page, information including parameters for JBIG-encoding; an encoding step for JBIG-encoding image information with the information managed page-by-page; a storing step for storing encoded data; and a decoding step for decoding, with the information managed page-by-page, encoded data that are stored.

Other objects of this invention will be apparent from the drawings as below and the following detailed description.

DETAILED DESCRIPTION OF THE PREFERRED EMBODIMENTS

Now, an embodiment according to this invention will be described in detail with reference to the drawings.

The embodiment will be described with an example in which an image storage apparatus according to this invention is applied to a facsimile machine. However, it goes without saying that this invention is not limited to this example but may be applied to other output apparatus for binary still images, such as copiers and printers.

Figure 1:
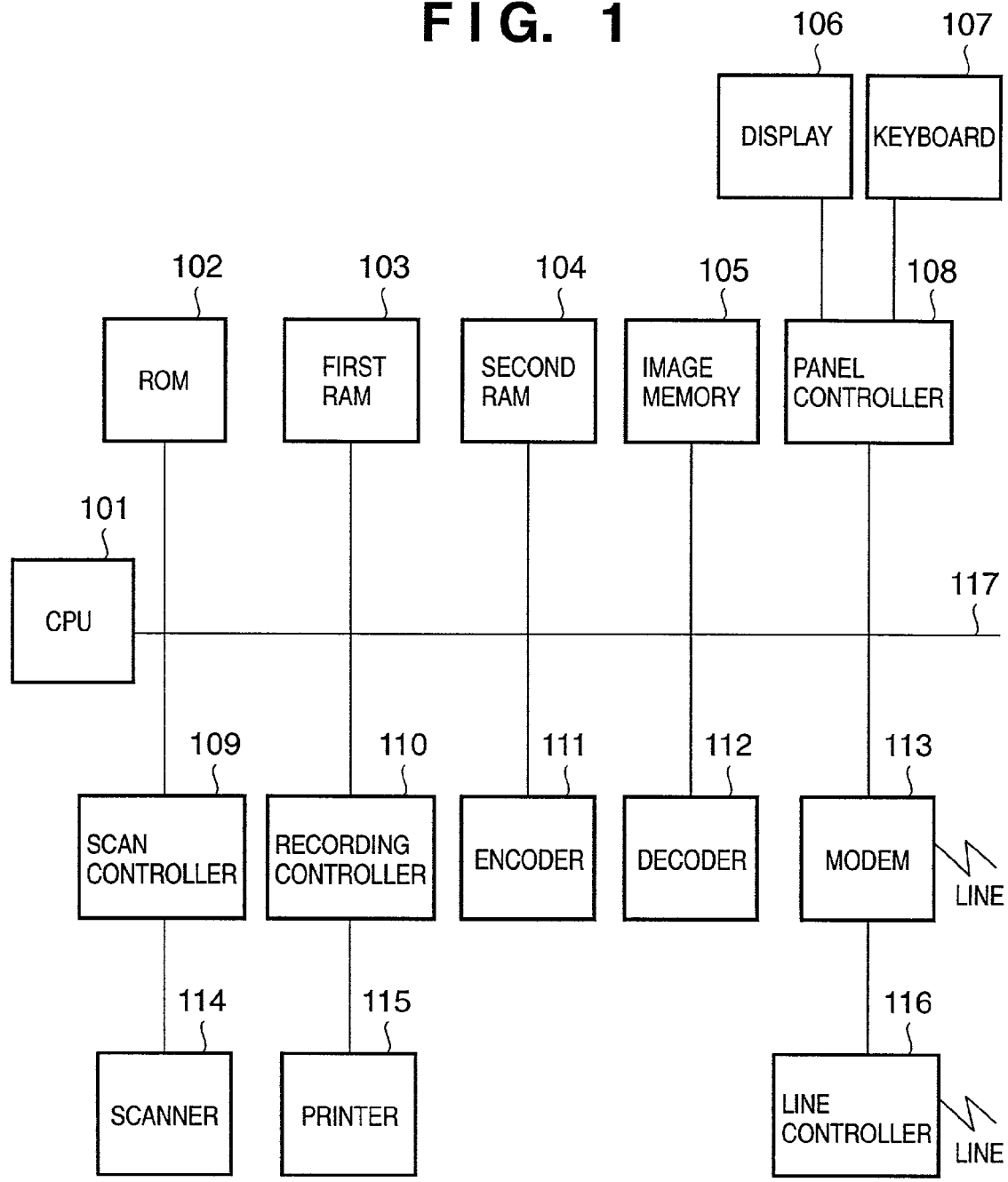
FIG. 1 is a block diagram showing a configuration of a facsimile machine according to an embodiment.

FIG. 1 is a block diagram showing a configuration of the facsimile machine according to this invention. The facsimile machine performs various kinds of facsimile processing with a CPU 101 as its core. To the CPU 101 are connected a ROM 102, a first RAM 103, a second RAM 104, an image memory 105, a panel controller 108, a scan controller 109, a recording controller 110, an encoder 111, a decoder 112, and a modem 113 via a system bus 117.

Further, a display 106 and a keyboard 107 (to be described later) are connected to the panel controller 108; a scanner 114 (to be described later) is connected to the scan controller 109; a printer 115 (to be described later) is connected to the recording controller 110; and a line controller 116 (to be described later) is connected to the modem 113.

Figure 3:
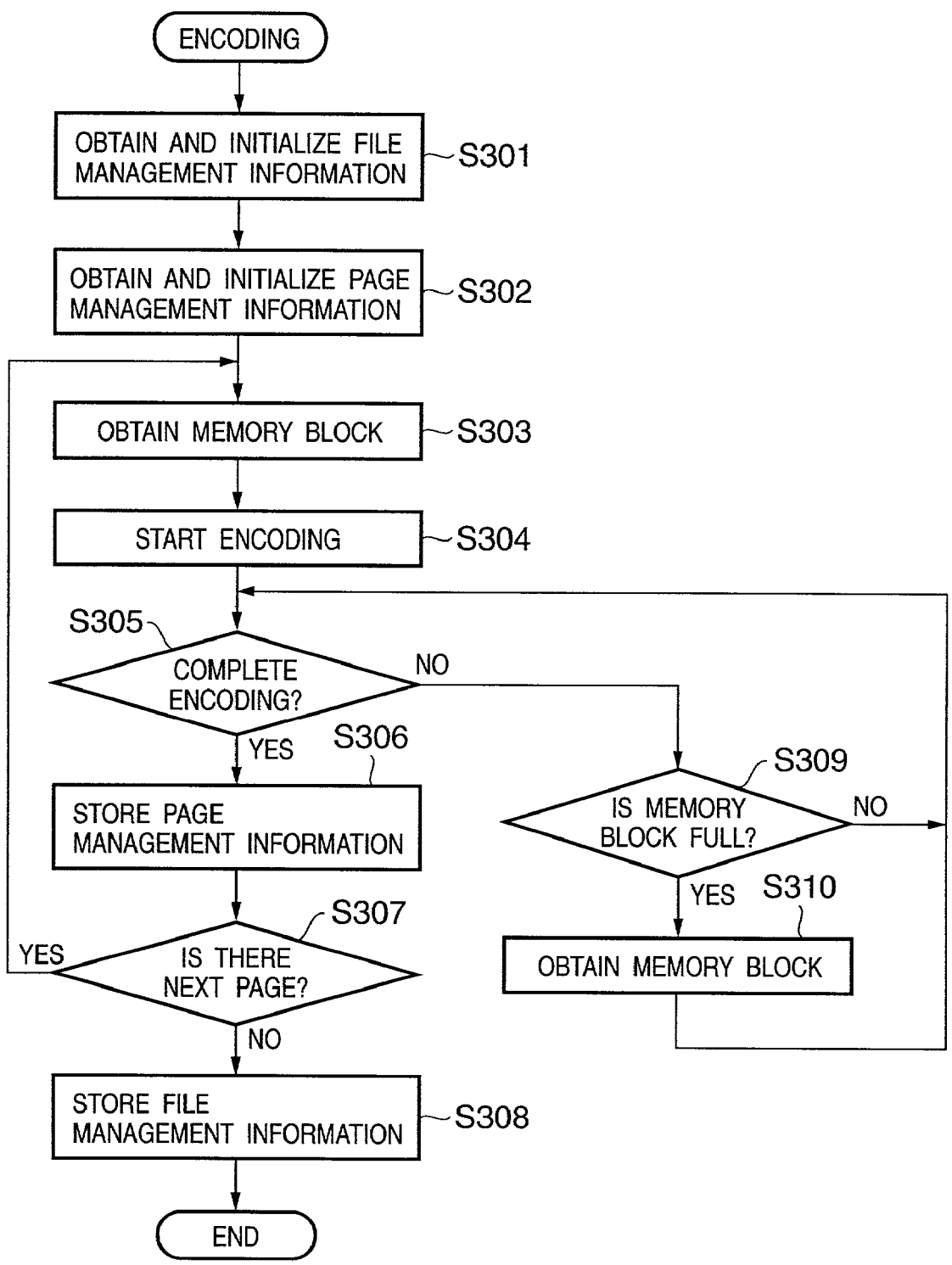
FIG. 3 is a flow chart showing control in encoding according to the embodiment.
Figure 4:
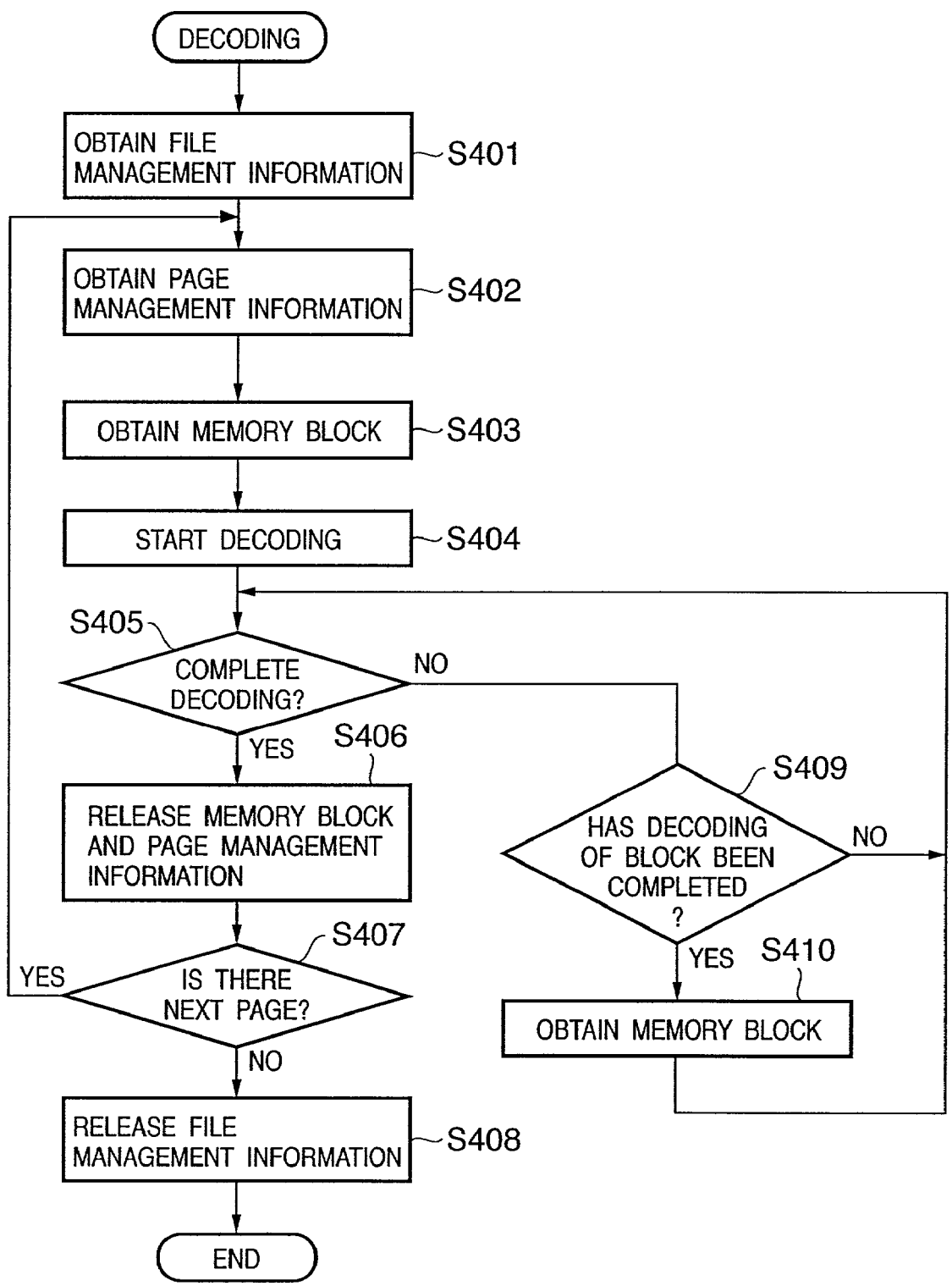
FIG. 4 is a flow chart showing control in decoding according to the embodiment.

Here, the CPU 101 executes binary code control procedures of ITU-T recommendations and performs various kinds of processing corresponding to the flow charts shown in FIGS. 3 and 4, while controlling other components according to various programs stored in the ROM 102. In these operations, the CPU 101 uses the first RAM 103 as a work area and a storage area for various data.

The encoder 111 and the decoder 112 are described in this embodiment as software modules executed by the CPU 101. However, these are not limited to this embodiment but may consist of dedicated hardware or of palmware having an encoding/decoding chip.

The scanner 114 connected to the scan controller 109 is composed of photoelectric conversion elements such as CCDs. It optically scans source images under the control of the scan controller 109 and electrically converts them, which is then output as digital image data. At this time, information such as the reception number, the receiver information, and the number of pages is stored in the second RAM 104 as file management information for the image data, and parameters for each page such as the resolutions, the image size, and the header (BIH) for JBIG encoding is stored in the second RAM 104 as page management information. Then, the image data scanned by the scanner 114 is sent to the encoder 111 via the scan controller 109, where the image data is compression-encoded with the JBIG coding scheme by using the parameters such as each header (BIH) of the page management information stored in the second RAM 104. Then, JBIG-encoded data (BID) portions are stored in the image memory 105 that consists of SDRAM or the like. At this time, information such as the sum values and the data sizes of the JBIG-encoded data (BID) portions is also stored in the corresponding page management information in the second RAM 104.

Next, when the image data stored in the image memory 105 is sent out, the image data is, under the control of the CPU 101, once decoded in the decoder 112 by using the parameters such as each header (BIH) of the page managing information stored in the second RAM 104, and encoded in the encoder 111 so that it suits the mode of the receiver facsimile machine; then, the image data is modulated by the modem 113 and sent out to the line via the line controller 116.

On the other hand, in facsimile reception, the following processing is performed under the control of the CPU 101. Data received through the line and the line controller 116 is demodulated by the modem 113 and checked for errors therein. Information such as the reception number, the sender information, and the number of pages is stored in the second RAM 104 as the file management information on the received image data, and parameters of each page such as the resolutions, the image size, and the header (BIH) portion for JBIG encoding are stored in the second RAM 104 as the page management information. The received image data is once decoded in the decoder 112 and then compression-encoded with the JBIG scheme in the encoder 111 by using the parameters such as each header (BIH) portion of the page management information stored in the second RAM 104. Then, JBIG-encoded data (BID) portions are stored in the memory 105 that consists of SDRAM or the like. At this time, information such as the sum values and the data sizes of the JBIG-encoded data (BID) portions is also stored in the corresponding page management information in the second RAM 104.

When a printed record of data (BID) stored in the image memory 105 is produced, the image data is decoded in the decoder 112 by using the parameters such as each header (BIH) of the page management information stored in the second RAM 104 under the control of the CPU 101 and printed by the printer 115 under the control of the recording controller 110.

The above-mentioned keyboard 107 has various keys (not shown) such as a ten-key pad for inputting phone numbers and a resolution key. By operating these keys, it is possible to input various kinds of instructions, settings, and information, the data on which is stored in the first RAM and displayed on an LCD or LED of the display 106 so that a user can check them. Here, the CPU 101 detects the data that is input from the keyboard 107 through the panel controller 108 to cause the display 106 to display necessary data.

Figure 2:
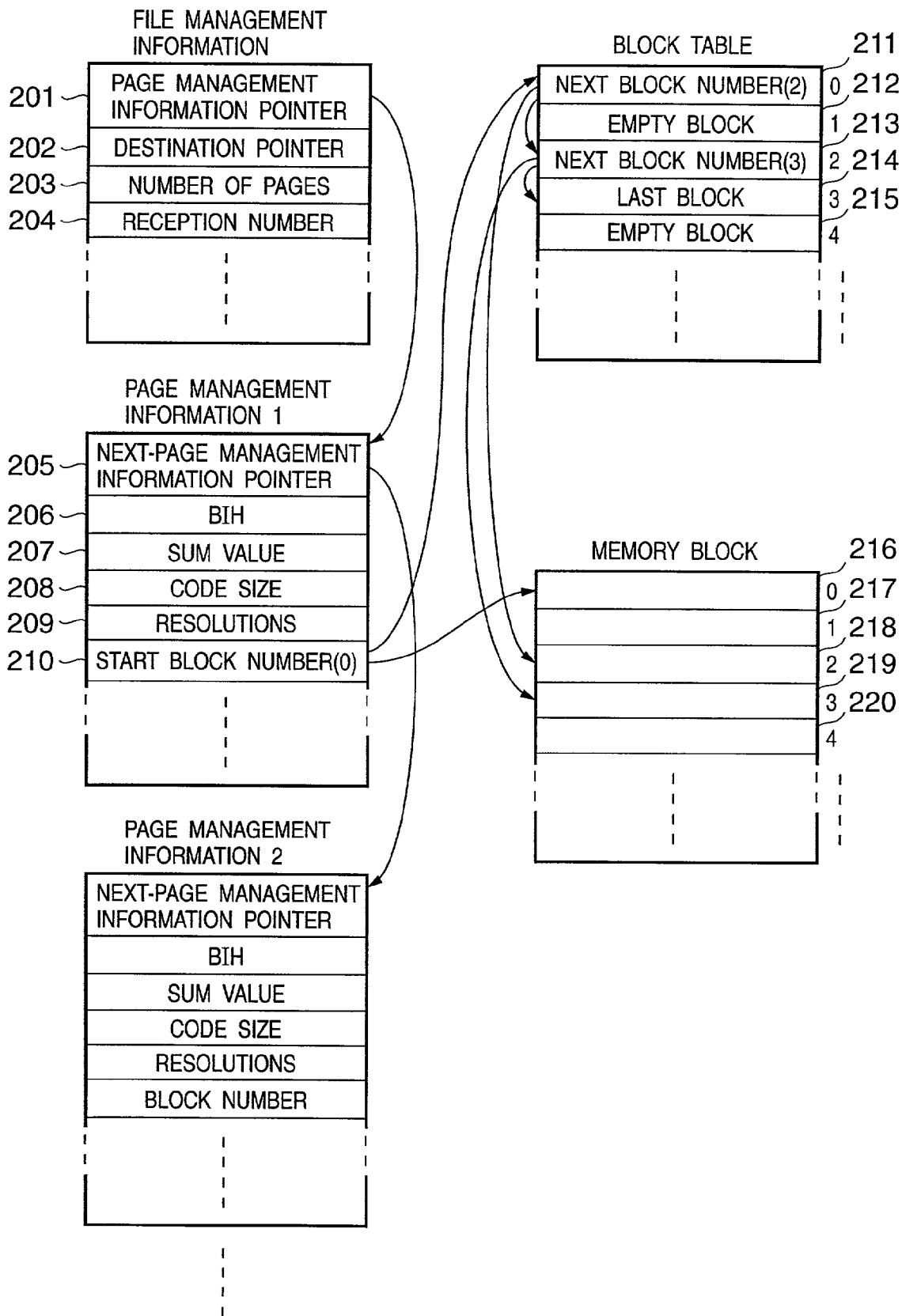
FIG. 2 is a block diagram showing the relationship between file management information, page management information, and stored images in the facsimile machine according to the embodiment.

FIG. 2 is a block diagram showing the relationship between the file management information, the page management information, and stored images in the facsimile machine according to this embodiment.

In this embodiment, a set of the file management information is assigned to the second RAM 104 on every facsimile transmission reservation or reception. As shown in FIG. 2, a set of the file management information consists of information such as a page management information pointer 201, a destination pointer 202, the number of pages 203, and a reception number 204. First, the page management information pointer 201 is for storing a pointer to page management information on the first page. In this example, it points to page management information 1 as the page management information on the first page. Second, the destination pointer 202 is for storing pointers to single button dialing numbers and speed calling numbers of registered phone numbers of facsimile receivers. The number of pages 203 is for indicating the number of pages of images reserved for transmission or received and managed by this file. The reception number 204 is the number assigned to this file for management.

Further, a set of the page management information is assigned to the second RAM 104 for each page of stored images. As shown in FIG. 2, each set of the page management information consists of information such as a next-page management information pointer 205, a header (BIH) 206, a sum value 207, a code size 208, resolutions 209, and a start block number 210. First, the next-page management information pointer 205 is for pointing to page management information managing a stored image corresponding to the page next to the stored image managed by the current page management information. Accordingly, the next-page management information pointer 205 points to page management information 2 managing a stored image of the second page, since the page management information 1 shown in FIG. 2 is the page management information on the first page. The same goes for the following pages, and the last page where there is no next page stores, for example, a null code therein. Second, the BIH 206 is for storing a header (BIH), which is a set of parameters for JBIG encoding and decoding of the page. The sum value 207 stores therein the sum value of the encoded data (BID) on the page. The code size 208 stores therein the size of the encoded data (BID) on the page, and the resolutions 209 stores therein the resolutions for horizontal scanning and vertical scanning on the page. The start block number 210 stores therein the first block number among the blocks in the image memory 105 in which the encoded data on that page is stored.

Here, the image memory 105 is divided into memory blocks of a certain size and used for storing the encoded data (BID). A block table shown in FIG. 2, which is a table for managing the memory blocks 216 to 220, stores next memory block numbers therein, i.e., a next block number 211, an empty block 212, a next block number 213, the last block 214, an empty block 215, etc., in the example shown in FIG. 2. This table is assigned to the second RAM 104. In the example shown in FIG. 2, the start block number 210 in the page management information 1 for the first page stores "0" therein, which indicates that the first memory block for the first page is allocated to the memory block 216 having the block number 0.

Further, the portion 211 corresponding to the block number 0 in the block table that manages each memory block stores "2" therein as the number of the next memory block, so that the encoded data following the block number 0 is stored in the memory block 218 having the block number 2. The portion 213 corresponding to the block number 2 in the block table stores "3" therein as the number of the next memory block, so that the encoded data following the block number 2 is stored in the memory block 219 having the block number 3. The portion 214 corresponding to the block number 3 in the block table stores therein the indication of the last block, which means that there is no block following the memory block 219 having the block number 3.

In the above-described example, the portions 212 and 215 in the block table corresponding to the block numbers 1 and 4 store therein the indication of an empty block, which means that the memory blocks 217 and 220 having the block numbers 1 and 4 are unused.

Now, processing in the facsimile machine having such a configuration will be described, in which image data scanned by the scanner 114 or image data received via the line controller 116 and decoded is compression-encoded by the encoder 111 with the JBIG coding scheme based on the page management information stored in the second RAM 104.

FIG. 3 is a flow chart showing control in encoding according to this embodiment. The control is executed by the CPU 101 according to programs stored in the ROM 102.

First, the CPU 101 obtains and initializes the file management information assigned to the second RAM 104 (S301). Similarly, the CPU 101 obtains and initializes the page management information assigned to the second RAM 104. Here, if the page is the first page, the address of the obtained page management information is stored in the page management information pointer 201 of the file management information obtained at step S301 (S302). In this initialization of the page management information, the header (BIH) portion, which is JBIG encoding/decoding parameters, is set in the BIH 206 of the page management information.

Next, a memory block arranged in the image memory 105 is obtained for storing encoded data (S303). The memory block obtained at this point becomes the memory block used first in the encoding of the page. Thus, the block number of the memory block is stored in the start block number 201 of the page management information. Then, the parameters stored in the BIH 206 of the page management information are set in the encoder 111, and the encoding is started (S304). Then, completion of the encoding is awaited (S305). The encoded data that is output at this point is only the data (BID) portion of the JBIG coding scheme, which is stored in the memory block obtained at step S303 mentioned above. It is checked whether no more data can be stored in the memory block, that is, whether the memory block is full or not. If the memory block is full (YES at S309), the next memory block is obtained (S310), and the data is stored in the obtained memory block. At this time, the indication of it is also stored in the block table, as shown in FIG. 2.

The processing at step S305, S309, and S310 repeats until the completion of the encoding is detected at step S305 mentioned above. Then, if the completion of the encoding is detected (YES at S305), the indication of the last block is stored in a portion in the block table corresponding to the memory block in which the encoded data is currently being stored, and the sum value and the code size determined in the encoder 111 are stored in the sum value 207 and the code size 208 of the page management information (S306). Then, it is checked whether there is data on a next page to be encoded. If there is a next page (YES at S307), the processing returns to step S302 described above to obtain and initialize the page management information on the next page. Then, the address of the obtained page management information is stored in the next-page management information pointer 205 of the page management information used for the encoding and storage of the previous page. The processing at step S302 to S307 repeats until the last page is reached.

On the other hand, if there is no next page (NO at S307), the indication of it is stored in the next-page management information pointer 205 in the page management information of the current page, and the page management information such as the total number of the pages encoded and stored is stored in the number of pages 203 and so on of the file management information (S308). Then, the encoding is completed.

Now, processing with which the decoder 112 decodes encoded data will be described.

FIG. 4 is a flow chart showing control in decoding according to this embodiment. The control is executed by the CPU 101 according to programs stored in the ROM 102.

First, the CPU 101 obtains the file management information on encoded data to be decoded, which has been assigned to the second RAM 104 (S401). Then, the CPU 101 obtains the page management information on the first page, which has been assigned to the second RAM 104, based on the page management information pointer 201 of the obtained file management information (S402). Further, the CPU 101 obtains the first memory block to be decoded in the image memory 105 according to the start block number 210 of the obtained page management information on the first page (S403).

Then, JBIG encoding/decoding parameters stored in the BIH 206 of the page management information obtained at step S402 are set in the decoder 112, and the decoding of the encoded data stored in the memory block obtained at step S403 is started (S404). Then, completion of the encoding is awaited (S405). Here, if the encoded data, which is only the data (BID) portion of the JBIG coding scheme, is stored across several blocks, it is checked whether the decoding of the current memory block has been completed or not (S409) If the decoding of the memory block has been completed (YES at S409), the block number of the next memory block is determined in the block table to obtain and decode the next memory block (S410).

The processing at step S405, S409, S410 repeats until the completion of the decoding is detected at step S405 described above. Then, if the completion of the decoding is detected (YES at step S405), the memory block and the page management information used for the storage of the encoded data on that page are released (S406). Specifically, they are released by storing an indication of an unused block, i.e., an empty block in a portion in the block table corresponding to the block number of the memory block used for that page, and by storing again, in the page management information pointer 201 of the file management information, data stored in the next-page management information pointer 205 of the page management information on that page. Then, it is checked whether there is a next page to be decoded (S407). If there is a next page, the processing returns to step S402 to obtain the page management information on the next page and repeats steps S402 to S407 until all the pages have been decoded. If there is no next page at S407, the file management information on the decoded file is released to complete the decoding.

Figure 5:
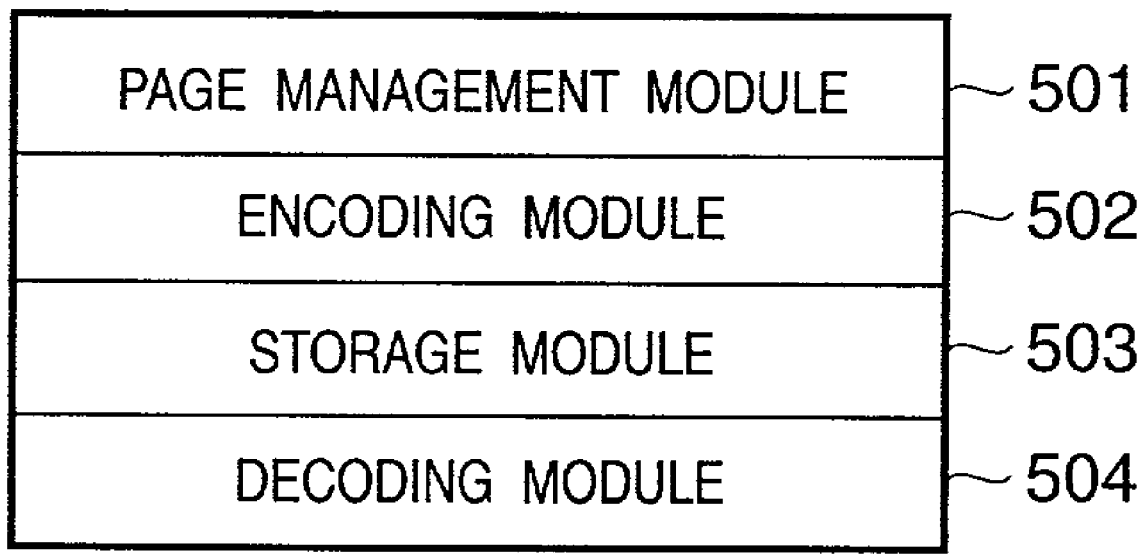
FIG. 5 is a diagram showing a memory map of a storage medium storing therein program modules executed by a CPU 101.

FIG. 5 is a diagram showing a memory map of a storage medium storing therein program modules executed by the CPU 101.

As shown in FIG. 5, the following modules are stored in the storage medium: a page management module 501 that stores therein and manages on a page-by-page basis various parameters of image information to be JBIG encoded, including the header (BIH) portions of the JBIG coding scheme; an encoding module 502 that performs JBIG encoding with the parameters stored by the page management module 501 and outputs the data (BID) portions of JBIG coding scheme; a storage module 503 that stores the data (BID) portions encoded by the encoding module 502; and a decoding module 504 that decodes the data (BID) portions of the JBIG coding scheme stored by the storage module 503 with the parameters stored by the page management module 501.

In this configuration, when data is encoded, the encoding module 502 JBIG-encodes the data using the header (BIH) portions of the JBIG coding scheme stored in the page management module 501, and the storage module 503 stores the data (BID) portions of the JBIG coding scheme, which are the output from the encoding module 502. When data is decoded, the decoding module 504 decodes the data (BID) portions of the JBIG coding scheme stored by the storage module 503 using the header (BIH) portions of the JBIG coding scheme stored by the page management module 501.

As described above, this embodiment provides the image storage apparatus and the image storage medium that enable efficient use of memory even though they adopt the JBIG coding scheme. This is realized because the JBIG-encoded data (BIE)'s header (BIH) portions of the JBIG coding scheme are separated from the JBIG-encoded data (BIE), then stored in the page management information and centrally managed, while only the data (BID) portions are stored as encoded data.

This invention may be applied to a system that is made up of a plurality of devices (for example, a host computer, an interface device, a reader, and a printer), or may be applied to an apparatus that consists of a single device (for example, a copier and a facsimile machine).

Further, it goes without saying that the objects of the invention are also achieved by providing a storage medium having program codes of software for realizing the functions of the above-described embodiment to the system or the apparatus, the computer (the CPU or MPU) of which reads out and executes the program codes stored in the storage medium.

In this case, the program codes themselves that are read out from the storage medium realize the functions of the above-described embodiment, so that the storage medium storing the program codes therein is a part of this invention.

The storage medium for providing the program codes may be, for example, a floppydisk, a harddisk, an optical disk, a magneto-optical disk, a CD-ROM, a CD-R, a magnetic tape, a non-volatile memory card, or ROM.

Further, it goes without saying that this invention also includes the case where an OS (operating system) or the like running on the computer performs a part or all of the actual processing based on instructions by the program codes so that the functions of the above-described embodiment are realized, as well as the case where the computer reads out and executes the program codes so that the functions of the above-described embodiment are realized.

Moreover, it goes without saying that this invention includes the case where the program codes are read out from the storage medium and written in memory in a feature expansion board inserted into the computer or a feature expansion unit connected to the computer, then a CPU or the like in the feature expansion board or the feature expansion unit performs a part or all of the actual processing based on instructions by the program codes so that the functions of the above-described embodiment are realized.

As described above, this embodiment enables efficient use of memory by storing and managing information page-by-page including the header portions of the JBIG coding scheme, and by storing only the data portions as encoded data.

Thus, this invention has been described with reference to the preferred embodiment. However, this invention is not limited to the above-described embodiment but can be modified within the scope of the claims.

What is claimed is:

1. An image storage apparatus comprising:
    managing means for managing, page-by-page, information including parameters for JBIG-encoding;
    encoding means for JBIG-encoding image information with the information managed page-by-page;
    storing means for storing encoded data; and
    decoding means for decoding, with the information managed page-by-page, encoded data that is stored.

2. The apparatus according to claim 1, wherein the managing means centrally manages the number of encoding lines on pages to be JBIG-encoded and the number of scanning lines on images scanned page-by-page by image scanning means as a common parameter.

3. The apparatus according to claim 1, wherein the managing means manages at least a sum value, an image size, and a resolution of encoded data in addition to the parameters.

4. The apparatus according to claim 1, wherein the image storage apparatus is applied to a facsimile machine, and the managing means manages the information managed page-by-page as one file in every facsimile transmission reservation or reception.

5. The apparatus according to claim 4, wherein the file includes at least a pointer to the information managed page-by-page, a destination, the number of pages, and a reception number.

6. An image storage method comprising:
    a managing step, of managing, page-by-page, information including parameters for JBIG-encoding;
    an encoding step, of JBIG-encoding image information with the information managed page-by-page;
    a storing step, of storing encoded data; and
    a decoding step, of decoding, with the information managed page-by-page, encoded data that is stored.

7. The method according to claim 6, wherein said managing step compnses centrally managing the number of encoding lines on pages to be JBIG-encoded and the number of scanning lines on images scanned page-by-page by image scanning means as a common parameter.

8. The method according to claim 6, wherein said managing step compnses managing at least a sum value, an image size, and a resolution of encoded data in addition to the parameters.

9. The method according to claim 6, wherein the image storage method is applied to a facsimile machine, and said managing step comprises managing the information managed page-by-page as one file in every facsimile transmission reservation or reception.

10. The method according to claim 9, wherein the file includes at least a pointer to the information managed page-by-page, a destination, the number of pages, and a reception number.

11. A program stored in a computer-readable medium which, when executed, causes a computer to execute the steps in the image storage method according to claim 6.

12. A program product stored in a computer-readable storage medium, the program product embodying a program that is executable to perform the image storage method according to claim 6.

* * * * *

UNITED STATES PATENT AND TRADEMARK OFFICE
CERTIFICATE OF CORRECTION

PATENT NO. : 7,072,078 B2
APPLICATION NO. : 09/946340
DATED : July 4, 2006
INVENTOR(S) : Makato Kobayashi It is certified that error appears in the above-identified patent and that said Letters Patent is hereby corrected as shown below:

ON COVER PAGE AT (56) FOREIGN PATENT DOCUMENTS

"10079846 A" should read --10-079846 A"--; and "2004015691 A" should read --2004/015691 A--.

COLUMN 6

Line 45, "(S409)" should read --S409).--.

COLUMN 7

Line 57, "a floppydisk, a harddisk," should read --a floppy disk, a hard disk,--.

COLUMN 8

Line 55, "compnses" should read --comprises--; and
Line 60, "compnses" should read --comprises--.

Signed and Sealed this

Third Day of July, 2007

JON W. DUDAS
*Director of the United States Patent and Trademark Office*